United States Patent
Habermann

(10) Patent No.: US 8,205,802 B2
(45) Date of Patent: Jun. 26, 2012

(54) PREMOUNTED UNIT OF A TUBE PORTION AND A THERMOSTAT VALVE

(75) Inventor: Rolf Habermann, Bergen (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 767 days.

(21) Appl. No.: 12/306,705

(22) PCT Filed: Aug. 22, 2007

(86) PCT No.: PCT/IB2007/002417
§ 371 (c)(1),
(2), (4) Date: Dec. 26, 2008

(87) PCT Pub. No.: WO2008/032151
PCT Pub. Date: Mar. 20, 2008

(65) Prior Publication Data
US 2009/0278071 A1    Nov. 12, 2009

(30) Foreign Application Priority Data
Sep. 12, 2006 (DE) .......... 10 2006 042 649

(51) Int. Cl.
*F01P 7/16* (2006.01)
(52) U.S. Cl. ............ 236/34.5; 236/93 A; 236/99 R; 236/99 K; 236/99 J; 236/100; 123/41.09
(58) Field of Classification Search .......... 236/34.5, 236/93 A, 99 R, 99 K, 99 J, 100; 123/41.09; 137/316; 251/337
See application file for complete search history.

(56) References Cited

U.S. PATENT DOCUMENTS

| | | | |
|---|---|---|---|
| 5,292,064 A | 3/1994 | Saur et al. | |
| 5,607,104 A * | 3/1997 | Naclerio et al. | 236/34.5 |
| 7,520,446 B2 * | 4/2009 | Maraux et al. | 236/95 |

FOREIGN PATENT DOCUMENTS

| | | |
|---|---|---|
| DE | 2003445 A1 | 8/1971 |
| DE | 9216490 U1 | 1/1993 |
| DE | 9204611 U1 | 8/1993 |
| DE | 4416240 C1 | 6/1995 |
| EP | 0661486 A1 | 7/1995 |
| GB | 1382408 A | 1/1975 |

OTHER PUBLICATIONS

ISR for PCT/IB2007/002417 dated Mar. 6, 2008.

* cited by examiner

*Primary Examiner* — Cheryl J Tyler
*Assistant Examiner* — Jonathan Bradford
(74) *Attorney, Agent, or Firm* — Lowe Hauptman Ham & Berner LLP

(57) ABSTRACT

A premounted unit includes a pipe stub and a thermostatic valve. The pipe stub includes a valve seat mechanically biased by a valve spring against the valve seat and resting at its other end against a mating rest element. The unit further includes an expansible element which is configured between a segment of the pipe stub and the valve member and which opens the thermostatic valve as a function of temperature against the force of the valve spring. The unit further includes a U-shaped retention yoke of which the central strip rests against the mating rest element and the legs are connected to an annular cap element thereby recesses being constituted at mutually opposite sides at the inside of the annular cap element and the legs of the retention yoke being fitted at its ends with outwardly pointing hook elements that engage the recesses.

11 Claims, 3 Drawing Sheets

PREMOUNTED UNIT OF A TUBE PORTION AND A THERMOSTAT VALVE

RELATED APPLICATIONS

The present application is based on International Application Number PCT/IB2007/002417 filed Aug. 22, 2007, and claims priority from German Application Number 10 2006 042 649.5 filed Sep. 12, 2006, the disclosures of which are hereby incorporated by reference herein in their entirety.

The present invention relates to a pre-assembled unit of a pipe stub and a thermostatic valve, in particular for an internal combustion engine.

In conventional internal combustion engine cooling-systems, a pump moves a coolant, as a rule a mixture of water and glycol, through the engine block and the cylinder head of the internal combustion engine and then through an oil-water heat exchanger and in parallel through a radiator. Conventionally a thermostatic valve is inserted in the circuit and is closed initially when starting the engine, as a result of which the coolant shall not pass through the radiator. The thermostatic valve is only opened at operating temperature by an expansible element so that the path to the radiator shall be open.

Thermostatic valves comprise a valve member prestressed by a valve spring against a valve seat and opened by the expansible element at a corresponding coolant temperature. At its other end the valve spring rests against a mating rest element. The mating rest element may simultaneously constitute a guide for the valve member and is linked by a U-shaped retention yoke to a portion of the cap element. The central strip of the U-shaped retention yoke passes through the mating rest element and the legs of the U are inserted into apertures in retaining arms integral with the cap element. Following assembly, said retaining arms project into the receiving aperture in the engine block.

The objective of the present invention is to create a pre-assembled unit of a pipe stub or a thermostatic valve which can be installed free of additional assembly labor into the engine block of an internal combustion engine.

The unit of the present invention is fitted with recesses in opposite sides on the inside of the annular cap element and the legs of the retention yoke are fitted at its ends with outwardly pointing hook portions entering said recesses.

Said recesses in the cap element may be manufactured in simple manner, in particular according to one embodiment mode of the present invention whereby the recess is linked by an aperture to the cap element's external side which faces the mating rest element. In this manner the pipe stub and the cap element may be made integrally by means of injection molding and be ejected from the mold by oblique sliders. In summary, the assembly by means of the above cited retention yoke is inherently simple. The manufacture according to the present invention moreover offers the advantage of allowing using a radial or O-ring seal sealing off the engine block. Using a radial or O-ring seal relieves the cap element from compressive forces that otherwise would arise in the presence of an axial seal. In summary, the cap element may be made smaller and consist of a comparatively more economical material.

The annular or O-ring seal may be secured in place in that a groove be constituted in the periphery of the cap element and shall at least partly receive said seal.

In a further embodiment mode of the present invention, the unit is designed to be integrated into an aperture of the motor vehicle's engine's block, said aperture being closed as needed by the cap element, further in that a stop situated some distance from the aperture is configured in the engine block and acts as a support for the mating rest element when the cap element seals off the aperture in a manner that the retention yoke's legs shall be at least partly relieved from the valve spring's pressure. This embodiment mode offers the advantage that the retention yoke may be made of plastic. This retention yoke is substantially freed from the operational forces exerted by the valve spring. The retention yoke needs absorbing the valve spring's bias forces only following assembly of the constituent parts and till the final assembly to the engine block.

One illustrative embodiment of the present invention is elucidated below in relation the Figures shown in the appended drawing.

Figure 1:
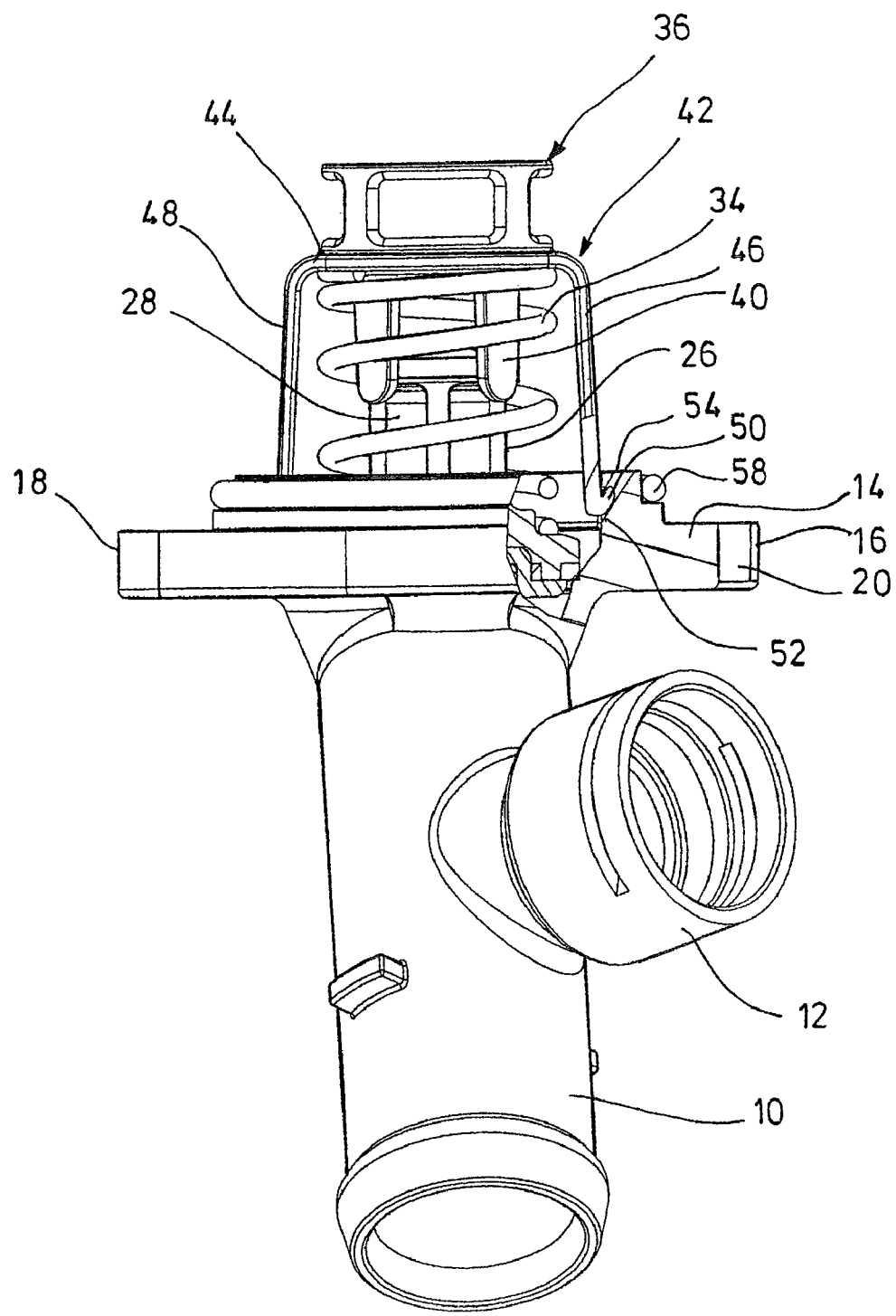
FIG. 1 is a perspective side-view of a unit of the present invention.
Figure 2:
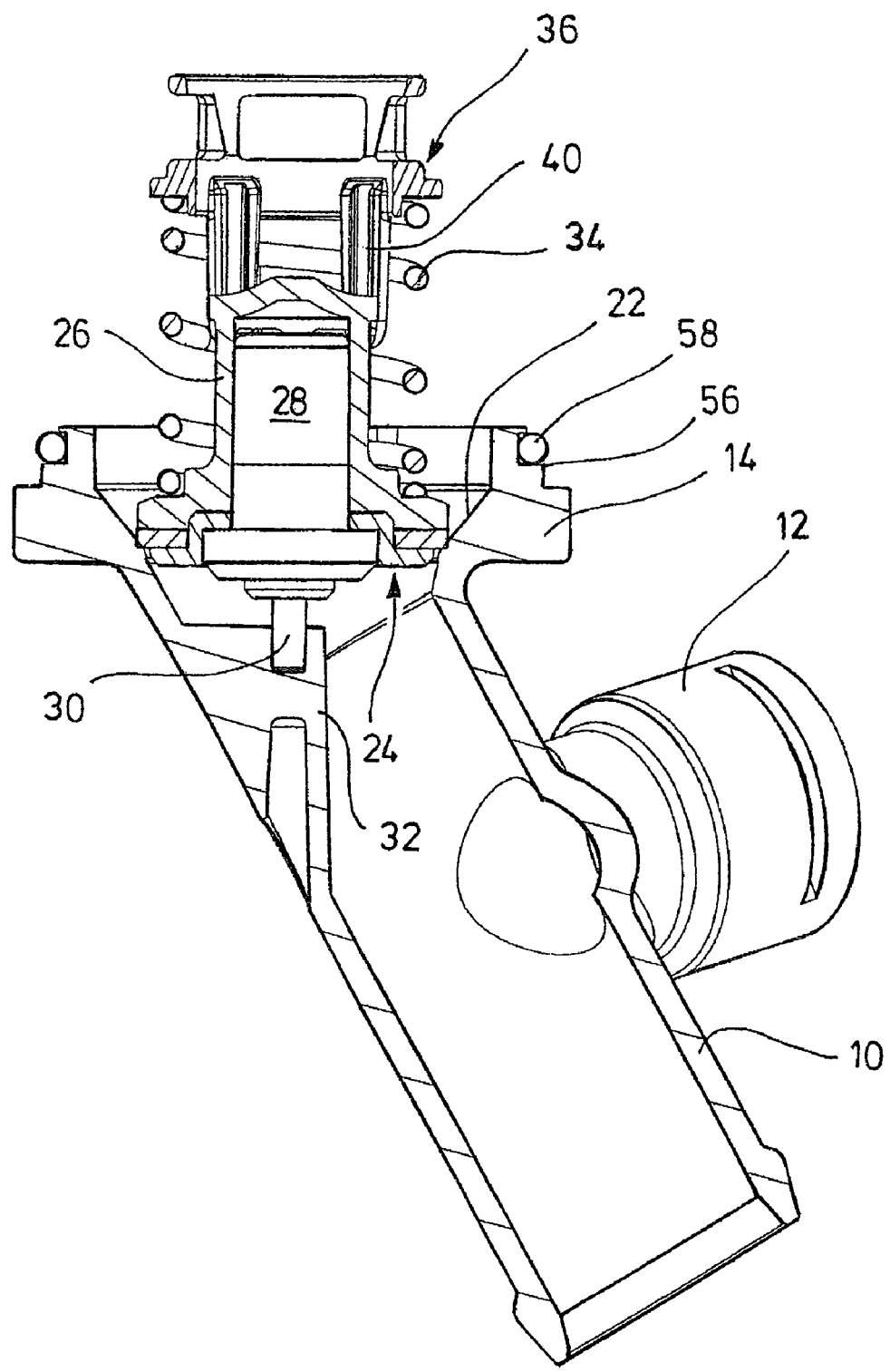
FIG. 2 is a section of FIG. 1 but in a position rotated relative to FIG. 1.
Figure 3:
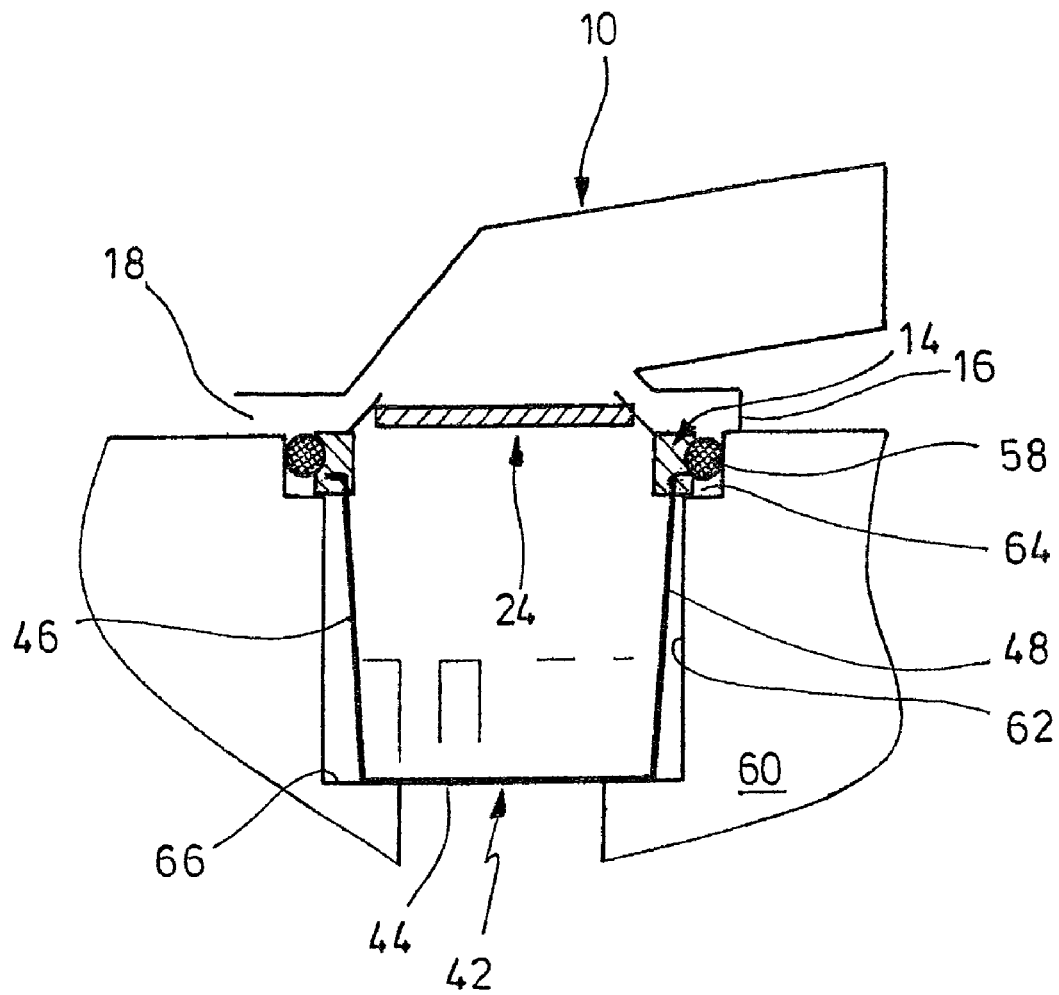

FIG. 3 schematically show the integration of the unit of FIGS. 1 and 2 into an internal combustion engine' engine block.

FIGS. 1 and 2 show a first pipe stub 10 between the ends of which issues a second stub 12. An annular cap element 14 is integrated into the end opposite the free ends of the first stub 10. The cap element is used to affix the unit shown in FIGS. 1 and 2 into an engine block aperture as further discussed below. For that purpose the cap element 14 comprises protrusions 16, 18 each fitted with an affixation hole 20.

The annular cap element 14 is fitted at its inner side with an oblique valve seat surface 22 cooperating with a valve member 24. The structure of this valve member 24 will not be discussed in detail herein.

The valve member 24 comprises an upright, hollow and piston-shaped casing 26 receiving an expansible element 28. A pin 30 of said expansible element rests on an inner offset 32 of the first stub 10. The annular valve member 24 is biased by a valve spring 34 against the valve seat 22. A cage-like mating rest element 36 is configured at the opposite end and supports the associated end of the valve spring 34. The mating rest element is fitted with mutually spaced, peripheral prongs 40 to guide the piston-shaped casing 26.

FIGS. 1 and 2 show the thermostatic valve's position at low coolant temperatures, for instance room temperature. When the temperature rises, the expansible element 28 applies a force on the valve member 24, as a result of which said valve member is lifted off the valve seat 22 to allow the coolant to flow through the cooling system of the omitted internal combustion engine and to operate a radiator. Such a principle is widely known.

As shown especially clearly in FIG. 1, a U-shaped retention yoke 42 comprises a central strip 44 and legs 46, 48. The central strip 44 runs through the mating rest element 36 and the legs 46, 48 are fitted at their lower ends with hook elements 50, said hook elements engaging a matching recess 52 at the inside of the annular cap element 14. The legs may be also slightly prestressed away from one another in order that the hook elements may snap into the recesses 52. The hook elements 50 subtend an acute angle with the associated legs 46, 48. As indicated at 54, the recesses are open toward the top side of the cap element 14. The retention yoke 42 is designed to keep together the pipe stub 10 and the thermostatic valve jointly with the mating rest element into one pre-assembled unit, the retention yoke 42 absorbing the bias of the spring 34.

A shoulder 56 is constituted in the periphery of the cap element 14 and receives a radial or O-ring seal 58. FIG. 3 shows that this zone comprises a groove to assure seating the O-ring 58. The O-ring is configured somewhat more deeply than the free top side of the cap element as indicated in the Figures.

An engine block 60 is shown in FIG. 3, its internal combustion engine being omitted. Also, the unit shown in FIGS. 1 and 2 is shown in FIG. 3 being integrated into an engine block aperture 62. Part of the cap element 14 is received in a first portion 64 of the cylindrical aperture 62 of which the cylinder wall is engaged by the radial or O-ring seal 58. While not shown here, the ears 16, 18 of the cap element 14 are screwed tight against the engine block 60.

As indicated in FIG. 3, the mating rest is forced during assembly against an offset 66 of the aperture 62 by a force sufficient to press the legs 46, 48 of the retention yoke 42 a slight distance toward the pipe stub 10. In this manner the offset 66 practically constitutes the mating rest element for the valve spring 34. As a result, the function of the retention yoke 42—which serves merely to constitute a pre-assembled unit such as shown in FIGS. 1 and 2, and which may be easily integrated into or removed from the aperture 62—is not needed in engine operation.

The invention claimed is:

1. A pre-assembled unit, comprising:
   an annular cap defining a valve seat;
   a thermostatic valve in the annular cap and including;
      a valve member received in the annular cap and mechanically biased by a valve spring to directly engage with the valve seat; the valve spring having one end resting directly against said valve member; and
      an expansible element surrounded by the valve spring;
   a mating rest element; and
   a U-shaped retention member received in the mating rest element and including
      a central strip directly sandwiched between the mating rest element and the other end of the valve spring, and
      legs extending from both sides of the central strip to the annular cap, wherein
   the annular cap further includes recesses, wherein each of the recesses is opposite to another recess, and
   each of the legs includes a hook element which outwardly extends toward the annular cap and is directly received in the respective recess.

2. The unit as claimed in claim 1, wherein each of the hook elements has an acute angle with respect to the respective leg.

3. The unit as claimed in claim 1, wherein the annular cap has an aperture facing the mating rest element and each of the recesses communicates through the aperture with an outside of the annular cap.

4. The unit as claimed in claim 1, further comprising a ring-shaped seal mounted on a periphery of the annular cap.

5. The unit as claimed in claim 4, wherein the annular cap further has a peripheral groove to receive the ring-shaped seal radial.

6. An internal combustion engine, comprising
   an engine block having an aperture for receiving the unit as claimed in claim 1,
   a stop arranged in the aperture spaced away from the annular cap, wherein
   the aperture is sealable by the annular cap,
   upon sealing the aperture by the annular cap, the mating rest element rests against said stop and the legs of the retention member are relieved at least partially from a pressure of the valve spring.

7. The unit as claimed in claim 1, wherein the retention member is made of plastic.

8. The unit as claimed in claim 1, further comprising a pipe stub connected to the annular cap, wherein the retention member is directly connected to the annular cap so that the pipe stub, the thermostatic valve and the mating rest element are joined together to define a single piece.

9. The unit as claimed in claim 1, wherein the valve further comprises a casing receiving the expansible element and extending within the retention member.

10. The unit as claimed in claim 9, further comprising a pair of projections projecting from the casing to be connected with the mating rest element without extending beyond the retention member.

11. The unit as claimed in claim 1, wherein the mating rest element has a cage shape.

* * * * *